(12) United States Patent
Huang et al.

(10) Patent No.: US 7,602,733 B2
(45) Date of Patent: Oct. 13, 2009

(54) PARAMETER SETTING DEVICE AND METHOD

(75) Inventors: Hsin-Nan Huang, Taipei Hsien (TW); Shao-Ming Kuo, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 507 days.

(21) Appl. No.: 11/556,174

(22) Filed: Nov. 3, 2006

(65) Prior Publication Data

US 2007/0133429 A1  Jun. 14, 2007

(51) Int. Cl.
*H04L 12/28* (2006.01)
*G06F 15/16* (2006.01)

(52) U.S. Cl. .................. 370/252; 370/401; 709/228; 455/41.2

(58) Field of Classification Search .......... 370/230, 370/252, 352, 401, 402, 395.41; 709/225, 709/228, 229; 455/39, 41.2, 68, 69; 725/37, 725/109; 726/3, 6; 340/459

See application file for complete search history.

(56) References Cited

U.S. PATENT DOCUMENTS

| | | | |
|---|---|---|---|
| 2003/0092395 | A1 | 5/2003 | Gassho et al. |
| 2004/0153992 | A1* | 8/2004 | Molina-Moreno et al. .. 717/105 |
| 2005/0228891 | A1* | 10/2005 | Itoh et al. .................. 709/228 |

FOREIGN PATENT DOCUMENTS

CN  1509058 A  6/2004

* cited by examiner

*Primary Examiner*—Afsar M. Qureshi
(74) *Attorney, Agent, or Firm*—Wei Te Chung

(57) ABSTRACT

An embodiment of the invention provides a parameter setting device. The parameter setting device is disposed in a client connected to the Internet via a network device, and includes a status detecting module, a user interface, a parameter generating module, and a data module. The status detecting module detects a connection status between the client and the network device. The user interface receives a detection result from the status detecting module and a parameter setting instruction input by a user. The parameter generating module generates network parameters according to the parameter setting instruction. The data module transmits the network parameters to the network device, and detects whether the network device has successfully set the network parameters.

20 Claims, 3 Drawing Sheets

PARAMETER SETTING DEVICE AND METHOD

BACKGROUND OF THE INVENTION

1. Field of the Invention

The invention generally relates to a parameter setting device and method, and particularly to a parameter setting device and method in a wireless network.

2. Description of Related Art

In a typical Institute of Electrical and Electronics Engineers (IEEE) 802.11 network environment with a client (e.g. a laptop) and a network device (e.g. an access point, a router, etc.), before accessing the Internet, a user using the laptop or personal computer has to preset network parameters thereof, such as a service set identifier (SSID), a wired equivalent protocol (WEP) and so on. Conventionally, the user initially sets network parameters of the network device through a computer by means of direct cable connection with the network device, and then manually sets network parameters of the client according to the parameters of the network device. The manual setting operation is often time consuming and lack of accuracy because at least two times of setting are needed to complete parameter setting at the network device end and the client end, and human errors are always causes to waste time when a lots of parameters are involved. Besides, it is always troublesome if a computer is necessary to use directly-cable connection with the network device for setting.

SUMMARY OF THE INVENTION

An embodiment of the invention provides a parameter setting device. The parameter setting device is disposed in a client connected to the Internet via a network device, and comprises a status detecting module, a user interface, a parameter generating module, and a data module. The status detecting module detects a connection status between the client and the network device. The user interface receives a detection result from the status detecting module, and receives a parameter setting instruction input by a user. The parameter generating module generates network parameters according to the parameter setting instruction. The data module transmits the network parameters to the network device, and awaits notification that the network device has successfully set the network parameters.

An embodiment of the invention further provides a parameter setting method applicable to a network device through a client, and the client is connected to the Internet via the network device. The parameter setting method comprises detecting whether the client is connected to the network device; detecting whether a parameter setting instruction is received if the client is connected to the network device; generating network parameters according to the parameter setting instruction if the parameter setting instruction is received; and transmitting the network parameters to the network device.

Other advantages and novel features will become more apparent from the following detailed description when taken in conjunction with the accompanying drawings, in which:

DETAILED DESCRIPTION OF THE INVENTION

Figure 1:
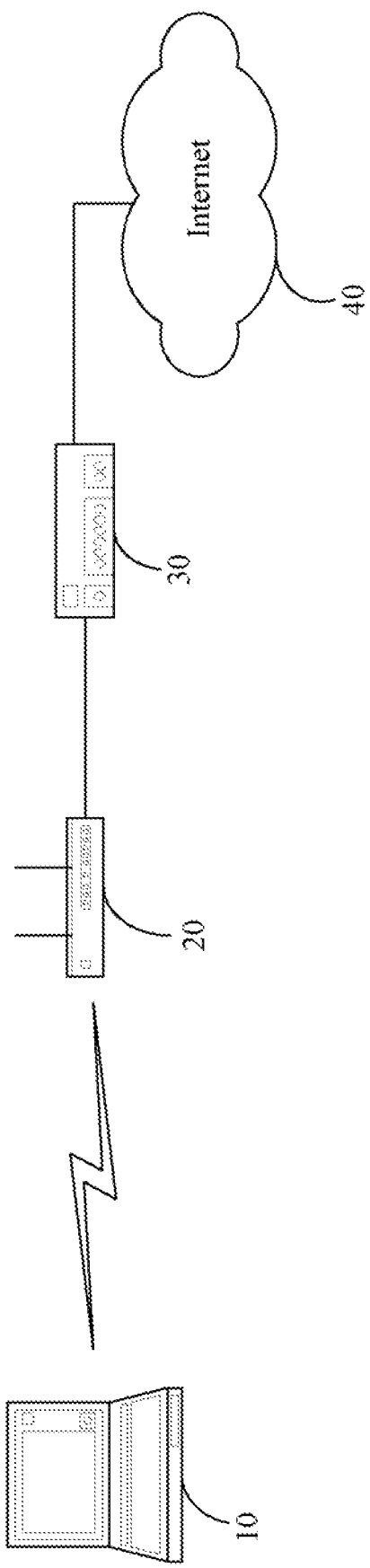
FIG. 1 is a schematic diagram illustrating an application environment of a parameter setting device of an exemplary embodiment of the invention.

FIG. 1 is a schematic diagram illustrating an application environment of a network, especially a wireless network, of a parameter setting device 100 of an exemplary embodiment of the invention.

A client 10 is connected to a central office (CO) 30 via a network device 20, and to the Internet 40 via the CO 30. In this embodiment, the client 10 may be a personal computer like a laptop or a desktop computer, the network device 20 may be a wireless router or an access point, and the CO 30 may be a digital subscriber line access multiplexer (DSLAM).

Figure 2:
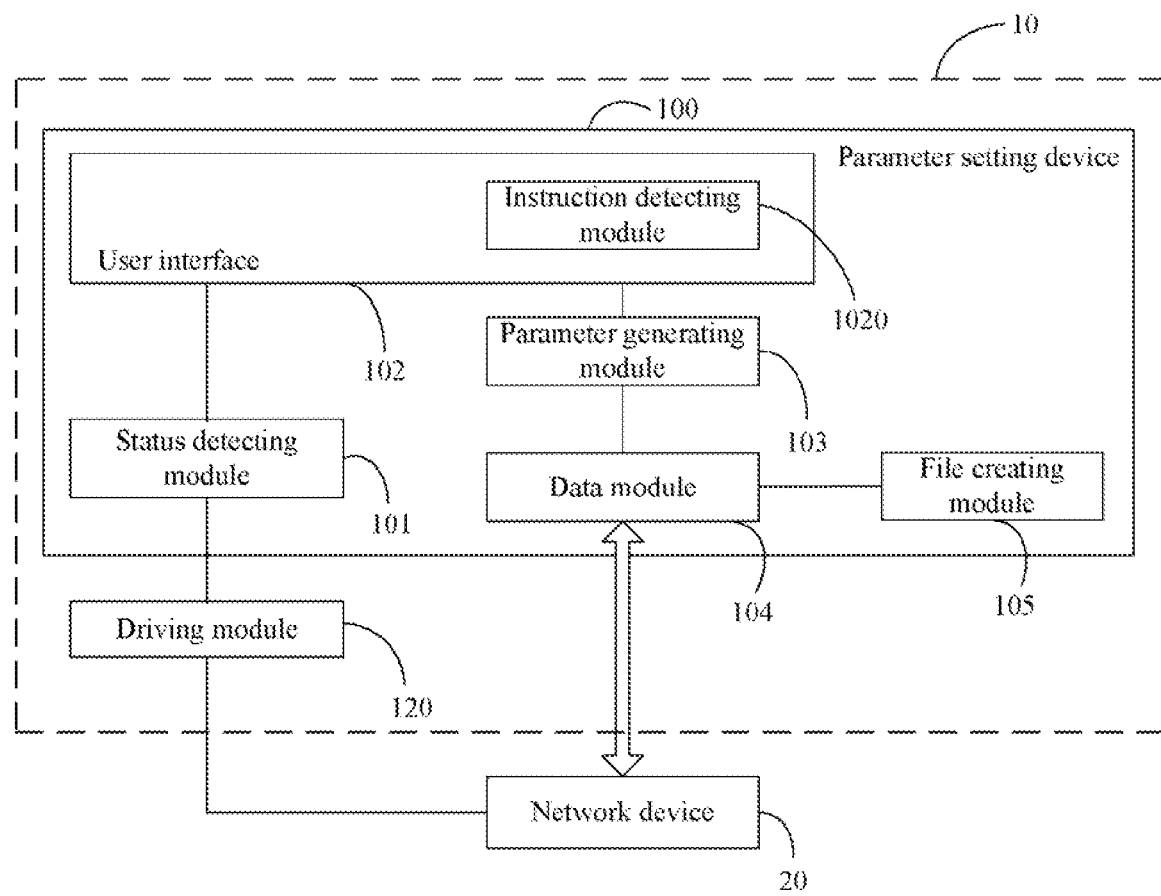
FIG. 2 is a block diagram of the parameter setting device of an embodiment of the invention.

FIG. 2 is a block diagram of the parameter setting device 100 of the embodiment of the invention.

The parameter setting device 100 is disposed in the client 10, and includes a status detecting module 101, a user interface 102, a parameter generating module 103, a data module 104, and a file creating module 105. The user interface 102 includes an instruction detecting module 1020. A driving module 120 is also disposed in the client 10.

The status detecting module 101 is electrically connected to the driving module 120, for determining a connection status between the client 10 and the network device 20 via the driving module 120.

The user interface 102 is electrically connected to the status detecting module 101, for receiving a detection result therefrom, and for receiving a parameter setting instruction input by the user. The instruction detecting module 1020 of the user interface 102 detects whether the user interface 102 receives the parameter setting instruction, and notifies the parameter generating module 103 if the user interface 102 receives the parameter setting instruction.

The parameter generating module 103 generates network parameters according to the parameter setting instruction. In this embodiment, the network parameters includes a service set identifier (SSID), a transmission mode of the wired equivalent protocol (WEP), a WEP key, and so on.

The data module 104 transmits the network parameters to the network device 20, and awaits notification that the network device 20 has successfully set the network parameters. In this embodiment, if the network device 20 has successfully set the network parameters, the data module 104 receives the notification therefrom, and transmits the notification to the file creating module 105.

The file creating module 105 creates an executive file after receiving the notification from the data module 104, and executes the executive file to set the network parameters of the client 10.

Figure 3:
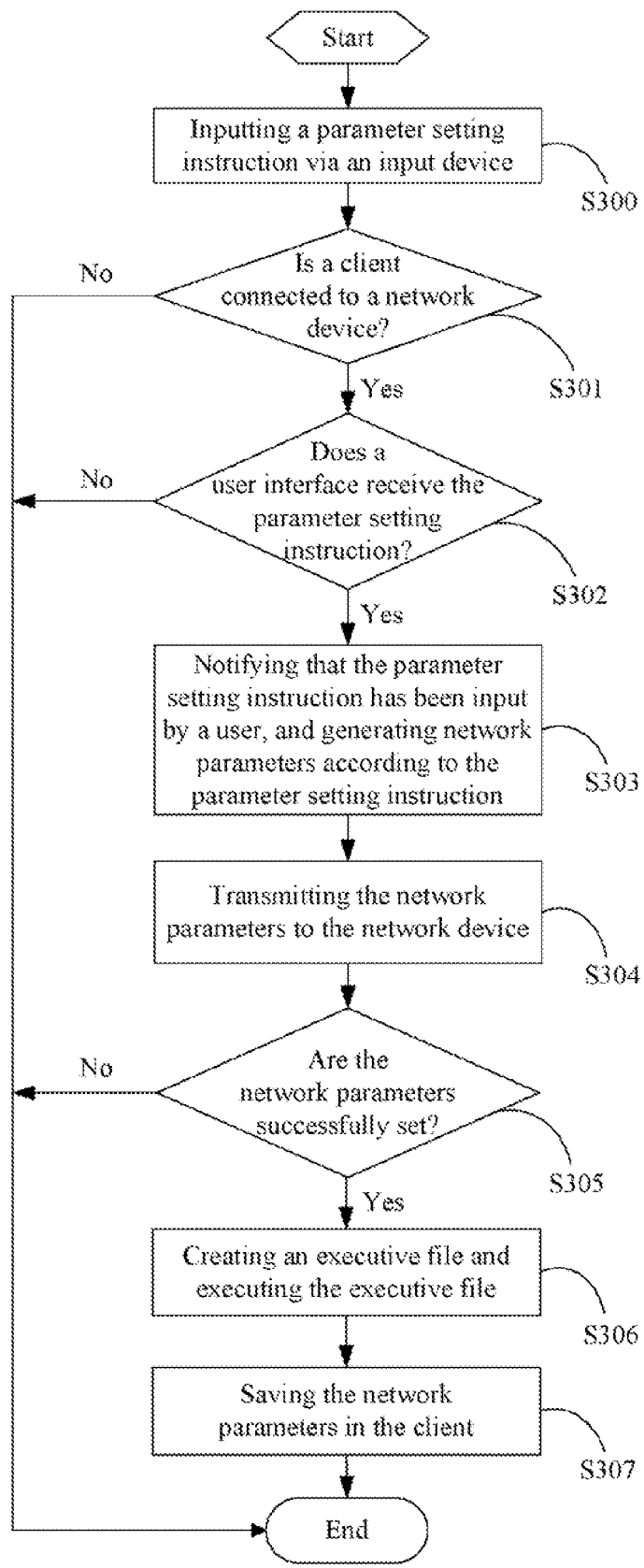
FIG. 3 is a flowchart of a parameter setting method of an embodiment of the invention.

FIG. 3 is a flowchart of a parameter setting method of an embodiment of the invention.

In step S300, a user inputs a parameter setting instruction via an input device (not shown). In this embodiment, the input device may be a mouse or a keyboard.

In step S301, the status detecting module 101 detects a connection status between the client 10 and the network device 20 via the driving module 120 to determine whether the client 10 is connected to the network device 20. If the client 10 is connected to the network device 20, the process proceeds to step S302.

In step S302, the instruction detecting module 1020 detects whether the user interface 102 receives the parameter setting instruction. If the user interface 102 receives the parameter setting instruction, the process proceeds to step S303.

In step S303, the instruction detection module 1020 notifies the parameter generating module 103 that the parameter setting instruction has been input by a user, and the parameter generating module 103 generates network parameters according to the parameter setting instruction. In this embodiment, the network parameters include a service set identifier (SSID), a transmission mode of the wired equivalent protocol (WEP), a WEP key, and so on.

In step S304, the data module 104 transmits the network parameters to the network device 20.

In step S305, the data module 104 checks whether the data module 104 receives notification from the network device 20 that the network parameters are successfully set thereby. If the data module 104 receives the notification, the network parameters are successfully set, and the process proceeds to step S306.

In step S306, the file creating module 105 creates an executive file, and executes the executive file to set network parameters of the client 10.

In step S307, the client 10 saves the network parameters.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A parameter setting device disposed in a client, the client connected to the Internet via a network device, the parameter setting device comprising:
   a status detecting module for detecting a connection status between the client and the network device;
   a user interface for receiving a detection result from the status detecting module, and for receiving a parameter setting instruction input by a user;
   a parameter generating module for generating network parameters according to the parameter setting instruction; and
   an data module for transmitting the network parameters to the network device, and for awaiting notification that the network device has successfully set the network parameters.

2. The parameter setting device of claim 1, further comprising an input device for input of the parameter setting instruction.

3. The parameter setting device of claim 2, wherein the input device comprises a mouse.

4. The parameter setting device of claim 3, wherein the input device comprises a keyboard.

5. The parameter setting device of claim 1, wherein the user interface comprises an instruction detecting module for detecting whether the user interface receives the parameter setting instruction.

6. The parameter setting device of claim 1, wherein the status detecting module detects the connection status between the client and the network device via a driving module.

7. The parameter setting device of claim 6, wherein the driving module is disposed in the client.

8. The parameter setting device of claim 1, wherein the data module is further for awaiting notification that the network device has successfully set the network parameters.

9. The parameter setting device of claim 8, further comprising a file creating module for creating an executive file, after the data module receives the notification from the network device, to set network parameters of the client.

10. The parameter setting device of claim 1, wherein the network parameters comprise a service set identifier.

11. The parameter setting device of claim 10, wherein the network parameters comprise a transmission mode of the wired equivalent protocol (WEP).

12. The parameter setting device of claim 11, wherein the network parameters comprise a WEP key.

13. The parameter setting device of claim 1, wherein the network device comprises an access point.

14. The parameter setting device of claim 13, wherein the network device comprises a wireless router.

15. A parameter setting method applicable to a network device through a client, the client connected to the Internet via the network device, the parameter setting method comprising:
   detecting whether the client is connected to the network device;
   detecting whether a parameter setting instruction is received if the client is connected to the network device;
   generating network parameters according to the parameter setting instruction if the parameter setting instruction is received; and
   transmitting the network parameters to the network device.

16. The parameter setting method of claim 15, further comprising detecting whether the network parameters are successfully set by the network device.

17. The parameter setting method of claim 16, further comprising creating an executive file if the network parameters are successfully set by the network device.

18. The parameter setting method of claim 17, further comprising executing the executive file to set network parameters of the client.

19. A method to set parameters in a network, comprising the steps of:
   connecting a client and a network device in a network for data communication therebetween;
   retrieving a parameter setting instruction in said client from a user of said client;
   generating corresponding network parameters according to said parameter setting instruction;
   transmitting said network parameters to said network device for setting through said network; and
   saving said network parameters in said client for use when said network parameters are successfully set in said network device.

20. The method of claim 19, wherein said network parameters comprise at least one of a service set identifier (SSID), a transmission mode of the wired equivalent protocol (WEP), a WEP key.

* * * * *